US011978427B2

(12) United States Patent
Karapatis et al.

(10) Patent No.: US 11,978,427 B2
(45) Date of Patent: May 7, 2024

(54) METHOD FOR FREQUENCY TUNING A SET OF PLATES OF A WATCH, AND WATCH COMPRISING THE SET OF TUNED PLATES

(71) Applicant: Montres Breguet S.A., L'Abbaye (CH)

(72) Inventors: Polychronis Nakis Karapatis, Premier (CH); Younes Kadmiri, Montfaucon (FR)

(73) Assignee: Montres Breguet S.A., L'Abbaye (CH)

( * ) Notice: Subject to any disclaimer, the term of this patent is extended or adjusted under 35 U.S.C. 154(b) by 106 days.

(21) Appl. No.: 17/663,119

(22) Filed: May 12, 2022

(65) Prior Publication Data

US 2022/0415294 A1 Dec. 29, 2022

(30) Foreign Application Priority Data

Jun. 29, 2021 (EP) .................................... 21182417

(51) Int. Cl.
*G10H 1/44* (2006.01)
*G04B 37/00* (2006.01)
*H04R 29/00* (2006.01)

(52) U.S. Cl.
CPC ........... *G10H 1/44* (2013.01); *G04B 37/0075* (2013.01); *H04R 29/001* (2013.01)

(58) Field of Classification Search
CPC ...... G10H 1/44; G04B 37/0075; G04B 21/08; G04B 21/06; G04B 23/02; G04B 23/12; H04R 9/00; H04R 9/06; H04R 9/18; H04R 29/00; H04R 29/001; H04R 17/00; H04R 17/10
See application file for complete search history.

(56) References Cited

U.S. PATENT DOCUMENTS 4,233,679 A * 11/1980 Schwarzschild ..... G04G 13/021 368/72
4,445,113 A * 4/1984 Mori ...................... G04C 21/02 968/581
(Continued)

FOREIGN PATENT DOCUMENTS

CA 2159961 A * 4/1996 ............. H01Q 1/273
EP 1 795 978 A2 6/2007
(Continued)

OTHER PUBLICATIONS

European Search Report dated Nov. 22, 2021 in European Application 211824172, filed on Jun. 29, 2021 (with English Translation of Categories ofcited documents), 3 pages.
(Continued)

*Primary Examiner* — Thang V Tran
(74) *Attorney, Agent, or Firm* — Oblon, McClelland, Maier & Neustadt, L.L.P.

(57) ABSTRACT

A method for frequency tuning a set of plates of a watch. The plates are disposed one above the other forming a watch dial with a space defined between the plates. A mechanical shock to the set of plates is generated, and the vibration frequency of each plate is checked. The vibration frequency of at least one of the plates is matched if different from the other plate so as to obtain an identical vibration frequency for each plate in order to tune the plates at least according to the first vibration eigenmode so as to avoid any contact between the plates as a result of any mechanical shock.

10 Claims, 2 Drawing Sheets

(56) References Cited

U.S. PATENT DOCUMENTS

| | | | | |
|---|---|---|---|---|
| 8,638,644 | B2 * | 1/2014 | Favre | G10K 9/20 368/272 |
| 9,519,271 | B2 * | 12/2016 | Karapatis | G10K 13/00 |
| 11,320,788 | B2 * | 5/2022 | Stranczl | G04B 37/0075 |
| 2007/0140067 | A1 | 6/2007 | Greubel et al. | |
| 2016/0052019 | A1 * | 2/2016 | Park | H10N 30/88 310/322 |

FOREIGN PATENT DOCUMENTS

| | | | | | |
|---|---|---|---|---|---|
| GB | 2055273 | A | * | 2/1981 | G04C 21/02 |
| GB | 2 234 369 | A | | 1/1991 | |

OTHER PUBLICATIONS

Japanese Office Action dated May 30, 2023 in Japanese Patent Application No. 2022-085803 (with English translation), 7 pages.

* cited by examiner

METHOD FOR FREQUENCY TUNING A SET OF PLATES OF A WATCH, AND WATCH COMPRISING THE SET OF TUNED PLATES

CROSS-REFERENCE TO RELATED APPLICATION

This application claims priority to European Patent Application No. 21182417.2 filed on Jun. 29, 2021, the entire disclosure of which is hereby incorporated herein by reference.

The invention relates to a method for frequency tuning a set of plates of a watch. The plates are preferably watch dial plates. The plates can also be used as sound-radiating membranes of a striking or musical watch.

The invention further relates to a watch comprising the set of plates tuned according to the tuning method.

PRIOR ART

In the case of a watch provided with superimposed plates as a watch dial, great care must be taken to avoid any mechanical shock to the watch that could cause contact between the superimposed plates, which can lead to breakage or cracking of one of the plates made of a fragile material. In general, the plates are spaced far enough apart to avoid contact with one another as a result of a mechanical shock. However, spacing the plates far enough apart is ill-suited when mounting in a conventional watch case, since a lot of space is lost in order to mount the various components.

A strike mechanism can also be present in a watch to generate a sound (note) or music. For this purpose, the gong of a striking watch or the pin-barrel of a musical watch are typically disposed inside the watch case. The vibrations of the gong or of the tongues of the pin-barrel are transmitted to the different external parts. These external parts are, for example, the middle, the bezel, the crystal and the back of the watch case, or even a dial with superimposed plates provided with a decoration to give the watch an aesthetically-pleasing appearance.

In the case of a musical or striking watch, the acoustic performance, based on the complex vibro-acoustic transduction of the external parts, is poor. In order to improve and increase the sound level perceived by the user of the striking or musical watch, the material, geometry and limit conditions of the external parts must be taken into account. The configurations of these external parts are also dependent on the aesthetics of the watch and on the operating constraints, which can limit the adaptation possibilities.

The frequency content of the sound of a striking or musical watch must be rich in a frequency interval between 0.5 kHz and 5 kHz or even 10 kHz. Conventional external parts do not provide effective radiation in this frequency band. Thus, in order to further improve the vibro-acoustic performance of the striking mechanism, one or more membranes are disposed inside the watch case, for example, one on top of the other with a space therebetween. The membranes are dimensioned and configured so that the one or more notes generated in the watch case are radiated efficiently. The frequencies of the notes generated must be close to the vibration eigenmodes of the membranes for them to vibrate in resonance. However, provisions are not typically made regarding the frequency tuning of these membranes, in particular so that they do not come into contact with one another mainly during a mechanical shock to the watch or also during the generation of a note or music.

The constraints regarding the arrangement of acoustic membranes are generally in contrast to the mechanical construction rules for ensuring the tightness and mechanical strength of the watch against shocks and high external pressures.

The European patent application No. 1 795 978 A2 describes a watch, which comprises a striking device. This striking device comprises two bell-shaped membranes, which are held in the watch case coaxially on top of one another by central support rods. Another thin membrane is also provided between the two bells and the back of the watch case, which is stressed and attached between the middle and the pierced back of the watch case. Depending on the radial stressing adjustment of the other membrane, the acoustic radiation frequency of this membrane can be adjusted. However, the other two bell-shaped membranes are not arranged to improve the sound level of the sound generated by the striking device, which constitutes a drawback. Moreover, no frequency tuning is sought by a frequency tuning method to improve the ability to withstand mechanical shocks that the watch may experience.

The European patent application No. 3 009 894 A1 describes a sound-radiating membrane arrangement for a striking or musical watch. The arrangement comprises a first membrane disposed superimposed on a second membrane. Peripheral edges of the two membranes are intended to hold the membranes inside a watch case. The first sound-radiating membrane is configured to efficiently radiate the frequencies in a first frequency band, whereas the second sound-radiating membrane is configured to efficiently radiate the frequencies in a second frequency band that is different from the first frequency band. A spacer ring is also disposed between the peripheral edges of the first and second membranes to define an acoustic cavity. No provision is made for a frequency tuning of the membranes so that they do not come into contact with one another as a result of an activation of the gong or tongues, or primarily as a result of a mechanical shock.

SUMMARY OF THE INVENTION

The purpose of the invention is thus to overcome the drawbacks of the aforementioned prior art by proposing a method for frequency tuning a set of plates of a watch, in particular forming the dial of a watch, so as to withstand the mechanical shocks to the watch, which can be a striking or musical watch.

To this end, the invention relates to a method for frequency tuning a set of plates of a watch, which comprises the features of the independent claim 1.

Particular steps of the method for frequency tuning a set of plates of a watch are defined in the dependent claims 2 to 10.

One advantage of the method for frequency tuning a set of plates of a watch is that at least two dial-forming plates can be tuned to improve the ability thereof to withstand mechanical shocks. Preferably, each dial-forming plate can also act as a sound-radiating membrane for a striking or musical watch. Each plate is frequency tuned, in particular by controlling, for example, the first vibration eigenmode. The two plates, which are spaced apart from one another by a relatively short, defined distance, are thus tuned in such a way that they do not come into contact with one another as a result of a mechanical shock to the watch. As a result of the frequency tuning of the plates, one whereof is made of a fragile material such as sapphire, the two plates are capable of vibrating in phase such that they do not come into contact with one another during a mechanical shock. It can also be used to improve the acoustic radiation of a note or music generated by the striking or musical watch.

Advantageously, a first dial plate is made of a metal material, whereas a second dial plate is made of sapphire, which is a hard, fragile and brittle material. In the watch case, the sapphire plate can be 0.4 mm thick or less.

Advantageously, the sapphire plate can act as a second dial to provide new aesthetic codes or it can also act as a vibrating and radiating membrane in conjunction with the first dial plate in the case of a striking or musical watch.

To this end, the invention further relates to a watch comprising the set of plates tuned according to the tuning method, which comprises the features of the independent claim 11.

BRIEF DESCRIPTION OF THE FIGURES

The aims, advantages and features of the method for frequency tuning a set of dial-forming plates of a watch will appear more clearly in the following description, in particular with reference to the drawings in which.

DETAILED DESCRIPTION OF THE INVENTION

In the following description, all of the well-known parts of a watch, for example of a striking or musical watch, will only be briefly described. Reference will be made exclusively to the method for frequency tuning a set of plates of a watch in order to improve the ability to withstand mechanical shocks that may be caused to the watch and the set of plates.

Figure 1:
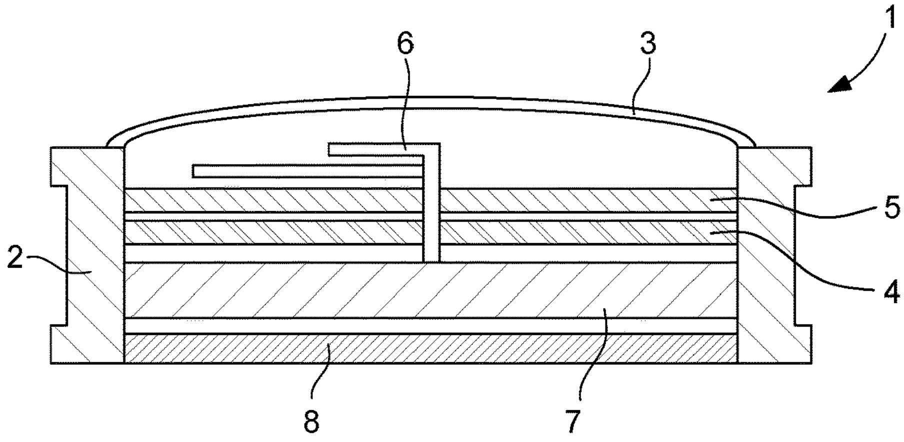
FIG. 1 shows a cross-section of a watch, for example a striking or musical watch, with a set of dial-forming plates spaced apart from one another and frequency tuned to improve the ability thereof to withstand mechanical shocks according to the invention.

FIG. 1 diagrammatically shows a cross-section of a watch 1 provided with a set of dial-forming plates 4, 5 in this embodiment. The watch 1 further comprises a case composed of a middle 2 closed on a top side by a glass 3 and on a bottom side by a back 8. The horological movement 7 is located between the back 8 and the dial-forming set 4, 5. Time-indicating hands 6 are connected to the horological movement 7 and project from the set of plates 4, 5 to indicate the time on a dial 5 of the set of dial-forming plates.

It goes without saying that it must be understood that the set of plates can be located elsewhere in the watch case and not necessarily be used as a set of dial-forming plates. This can be two plates spaced apart from one another forming part of the watch case middle 2, or part of the back 8 of the watch case for example, or located elsewhere in the watch case.

The set of dial-forming plates 4, 5 comprises a first dial plate 4, for example made of a metal material, and above this first dial plate 4, a second plate 5 made of a hard, fragile material, for example made of sapphire or another fragile material. Preferably, the second plate 5 is substantially transparent so that aesthetic inlays or indexes can be viewed on the bottom surface of the second plate 5, or also on the top surface of the first plate 4.

The two plates 4, 5 are mounted such that they are spaced apart from one another at a defined distance. For example, a distance of less than or equal to 1 mm can be provided between the two plates 4, 5. Preferably, the distance separating the plates 4, 5 can be much less than 1 mm, for example 0.1 mm, so as not to lose too much space in the watch case 1. However, the plates 4, 5 spaced apart from one another must be configured so that they do not come into contact with one another during mechanical shocks. A frequency tuning method is thus carried out in order to be able to match the vibration frequency to at least the first vibration eigenmode of both of the plates 4, 5 as discussed in the description hereinbelow.

It should be noted that in the event of a mechanical shock, the elements that make up the external parts and the movement of the watch 1 undergo strong accelerations. Under such acceleration, the set of dial-forming plates 4, 5 deforms and can potentially come into contact with the neighbouring parts such as the hands 6 for example. In the specific case of the construction of the present invention, a sapphire plate 5 can be added, spaced apart from a dial plate 4 due to aesthetic codes, and can come into contact with the dial plate 4 during a mechanical shock. Depending on the height from which the external parts are dropped, the first dial plate 4 of the set can come into contact with the second sapphire plate 5, which can cause this second sapphire plate 5 to break as it is a fragile material. In order to guarantee the ability of the watches to withstand mechanical shocks, which includes the set of plates 4, 5, all of the elements that compose the watch must be correctly dimensioned. However, the aesthetics of the watch generate constraints, which are sometimes incompatible with a construction that guarantees good mechanical strength in the event of a mechanical shock.

Since sapphire is a fragile material, any direct shock to this type of material should preferably be avoided. Several possibilities exist in the watch 1 with a set of plates 4, 5 for avoiding any contact between the two plates 4, 5, which are to:

- Increase the stiffness of the first dial plate 4 to prevent it from deforming. The first dial plate 4 is an aesthetic element that is decorated and often made using noble and very dense materials. The first dial plate 4 must thus have a substantial thickness to prevent it from deforming. However, this would increase the overall thickness of the external parts, which is not desired.
- Increase the gap between the first dial plate 4 and the second sapphire plate 5. The first dial plate 4 could be deformed by the mechanical shock without coming into contact with the other second plate 5, which would also vibrate. The increase in the distance between the first dial plate 4 and the second sapphire plate 5 directly affects the thickness of the external parts and the aesthetics of the watch. The readability of the dial could also be impaired.
- Tune the eigenfrequencies of the first dial plate 4 and those of the second sapphire plate 5 so that the first dial plate 4 and the second sapphire plate 5 vibrate in phase and do not knock against one another without increasing the gap between the two elements fixed by the design.

Figure 4:
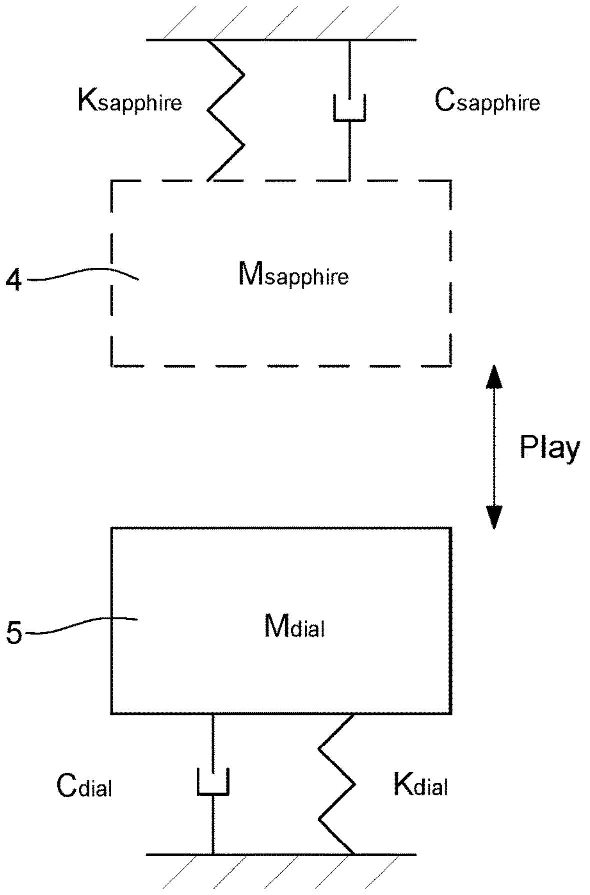
FIG. 4 shows a digital model for determining vibration frequencies and the frequency tuning of the set of plates of a watch according to the invention.

It should be noted that the present invention is mainly based on the last item in the above list. A digital model was thus developed to predict the dynamics of the first dial plate 4 and of the second sapphire plate 5 in the event of a shock to the external parts. The first dial plate 4 and the second sapphire plate 5 are represented by weight-spring-shock absorber systems as shown in FIG. 4 described hereinbelow (modelling the deformation of the first eigenmode of the first dial plate 4 and that of the second sapphire plate 5). The two weights are separated from one another by a play imposed by the construction (FIG. 4).

Figure 3A:
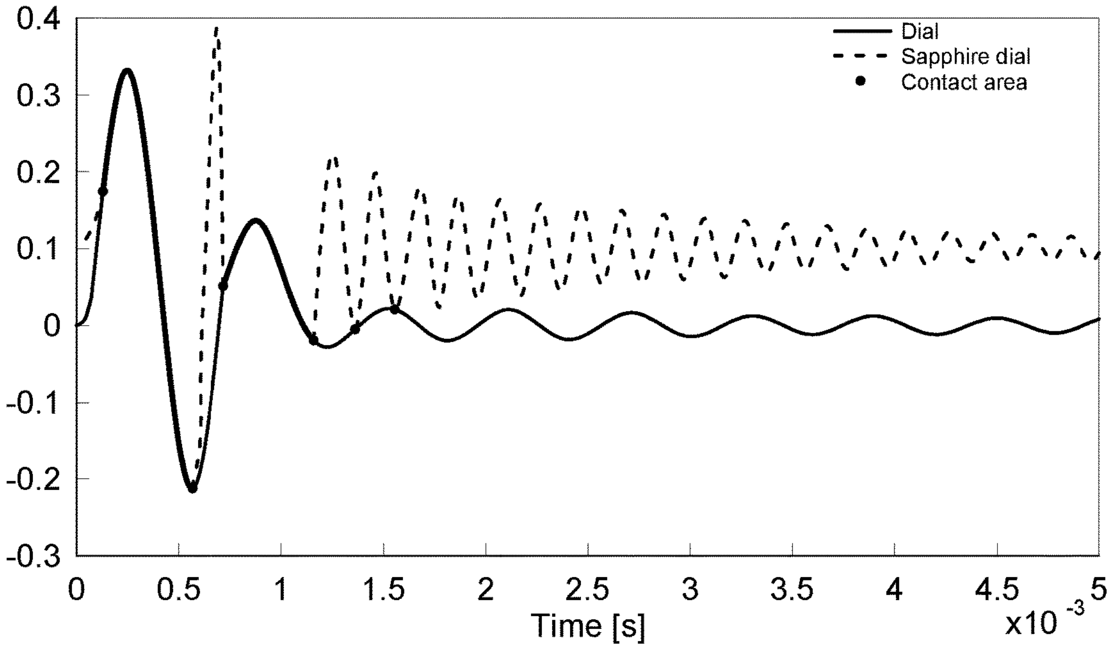
FIGS. 3*a* and 3*b* show two graphs of the set of dial-forming plates vibrating as a result of a mechanical shock or during a strike or music before and after the frequency tuning of the set of plates according to the invention.
Figure 3B:
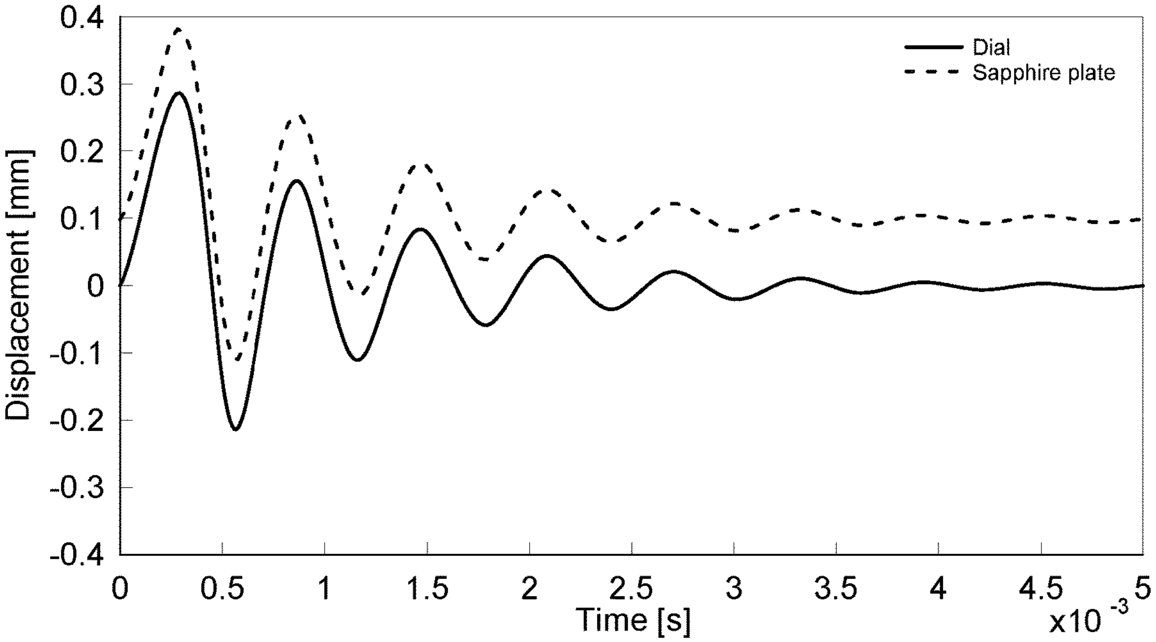

FIGS. 3*a* and 3*b* show graphs regarding the method for frequency tuning the plates of the set before and after the frequency tuning operations. FIG. 3*a* shows the state before frequency tuning, whereas FIG. 3*b* shows the state after frequency tuning. The vibration of the first plate is shown in solid lines, whereas the vibration of the second plate is shown in dotted lines.

For the frequency tuning method, the vibration of each plate 4, 5 is checked after a mechanical shock generated by a test apparatus on which the one or more plates 4, 5 are placed such that they are superimposed one on top of the other with a determined space between the two plates. Depending on the vibration of each plate, it can be seen whether one plate is coming into contact with the other, which is the case shown in FIG. 3*a*. The mechanical shock occurs at time T=0. After the mechanical shock, each plate 4, 5 vibrates or oscillates at a frequency that depends on the dimensions of the plate, the shape of the plate, and the material from which it is made. It can be seen that the first metal plate oscillates at a frequency slightly above 1 kHz, whereas the second sapphire plate oscillates at a frequency that is higher than the vibration frequency of the first plate and slightly above, for example, 2 kHz with the vibration for either of the plates attenuating over time. It can be seen that with these differences in vibration, the second plate comes into direct contact with the first plate (the darker parts in FIG. 3*a*) and subsequently through single-point contacts shown by dots, which is capable of causing breakage points on the second plate made of a fragile material. After a frequency analysis of the vibration of each plate by the test apparatus, the means of correction can be determined for each plate or at least for one of the plates so as to cause the two vibrating plates to vibrate in phase. In this scenario, once the plates are vibrating at a substantially equivalent frequency, they are thus in phase according to at least the first vibration eigenmode without coming into contact with one another as shown in FIG. 3*b*.

It should be remembered that, after this step of the method shown in FIG. 3*a*, where the plates come into contact with one another, a configuration must be carried out for at least one of the plates. At least one of the plates must be configured or adapted so that it vibrates at the vibration frequency of at least a first vibration eigenmode of the other plate. Thus, following a mechanical shock to the plates 4, 5, the two plates, the vibration frequency whereof is matched in particular according to at least the first vibration eigen-mode, no longer come into contact with one another, which allows the second plate 5 made of a fragile material to be protected, as shown in FIG. 3*b*.

In order to match the vibration frequency of the plates, an action can be made on at least one of the plates by adding a weight thereto in a determined position, for example at the centre thereof, in order to have the same phase deformation as the other vibrating plate. The added weight can be driven into the centre of the second plate. The addition of a plurality of small inertia-blocks in different places on the plate can also be considered.

The stiffness or conditions at the limits of the set of plates or of at least one of the plates can also be modified in order to avoid any contact of each plate with one another as a result of a mechanical shock. It goes without saying that, instead of adding a weight or modifying the stiffness, an action can also be made on one of the plates using a laser to locally etch or remove material to modify the vibration frequency until obtaining a vibration frequency of at least the first vibration modes that is equal for both plates. This allows the two plates to be spaced apart by a short defined distance, for example 0.1 mm, while ensuring that they do not come into contact with one another as a result of a mechanical shock.

It should be noted that for the configuration of either of the plates 4, 5, a developed digital model (FIG. 4) implemented in the test apparatus can be used and is capable of determining the matching means for the frequency tuning of one of the plates. It goes without saying that several successive steps of checking the vibration frequency of each plate can be considered in order to manage, step-by-step, to configure at least one of the plates so as to obtain, at the end of the method, both plates vibrating in phase.

The eigenfrequencies of the dial and those of the sapphire plate must be characterised (since they depend on the manufacturing tolerances of these components) in order to adjust the weight added to the centre of the sapphire plate on a case-by-case basis.

The frequency test apparatus for the frequency tuning of the method will not be described in more detail, since the components of the apparatus are already known for other fields.

As specified hereinabove, the set of dial-forming plates can also act as sound-radiating membranes of a striking or musical watch and for which the tuning of said plates or membranes is sought so that they vibrate in phase without coming into contact with one another.

Figure 2:
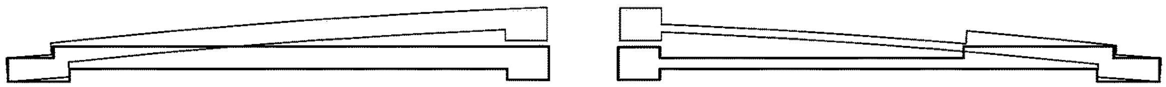
FIG. 2 shows a cross-section of the deformation of the first eigenmode of at least one plate of the set of dial-forming plates according to the invention.

By way of illustration, FIG. 2 shows just a cross-section of the deformation of at least the first eigenmode of the first dial plate 4. It goes without saying that the deformation of the first eigenmode of the set of plates 4, 5 or of higher eigenmodes could also have been illustrated.

From the description which has just been made, several alternative embodiments of the method for frequency tuning a set of plates of a watch can be conceived by a person skilled in the art without departing from the scope of the invention defined by the claims.

The invention claimed is:

1. A method for frequency tuning a set of plates of a watch, the plates being disposed on top of one another with a space defined between the plates, and wherein the set of plates forms a dial of the watch, with at least a first dial plate and a second plate on top of and spaced apart from the first plate, the method comprising:

checking a vibration frequency of each plate after a mechanical shock is generated to the set of plates;

matching the vibration frequency of at least one plate of the set of plates according to a vibration eigenmode if the vibration frequency of the at least one plate is different from the vibration frequency of another plate of the set of plates; and obtaining a match vibration frequency for each plate according to the vibration eigenmode for tuning the plates to avoid any contact between the plates as a result of the mechanical shock.

2. The method for frequency tuning a set of plates according to claim 1, wherein the second plate is made of a fragile, brittle material, such as sapphire, wherein the set of dial-forming plates is tested in a test apparatus, which generates the mechanical shock to the set of plates, wherein the matching of the vibration frequency including tuning the two plates to the same vibration frequency and to be in phase to avoid any contact between the plates as a result of any future mechanical shock.

3. The method for frequency tuning a set of plates according to claim 1, wherein the first plate is spaced apart from the second plate by 0.1 mm or less, wherein the vibration frequency of the second plate is matched at least to the vibration eigenmode of the first plate which is made of a metal material.

4. The method for frequency tuning a set of plates according to claim 3, wherein a plurality of frequency determination and matching operations are carried out until obtaining the same vibration frequency relative to at least one vibration eigenmode resulting from a mechanical shock to the plates.

5. The method for frequency tuning a set of plates according to claim 1, the matching of the vibration frequency includes matching the vibration frequency of one of the plates so that it is in phase with the vibration frequency of the other plate, and adding a weight to one of the plates, the vibration frequency of the plate with the added weight is greater than that of the other plate.

6. The method for frequency tuning a set of plates according to claim 5, wherein the adding a weight including driving the weight into the centre of the second plate.

7. The method for frequency tuning a set of plates according to claim 1, wherein the matching of the vibration frequency includes matching the vibration frequency of one of the plates that is in phase with the vibration frequency of the other plate, and modifying the stiffness or limit conditions of the set of plates or of at least one of the plates.

8. The method for frequency tuning a set of plates according to claim 1, wherein the matching of the vibration frequency includes matching the vibration frequency of one of the plates Go that it that is in phase with the vibration frequency of the other plate, a laser to locally etch or remove material in order to obtain the same vibration frequency on at least the vibration eigenmode of the two plates.

9. The method for frequency tuning a set of plates according to claim 2, wherein the test apparatus includes a digital model for the frequency tuning of the set of plates with frequency matching for each test.

10. The method for frequency tuning a set of plates according to claim 1, wherein the two plates forming a dial of a watch are sound-radiating membranes.

* * * * *